(12) United States Patent
Shahid et al.

(10) Patent No.: US 11,115,992 B2
(45) Date of Patent: Sep. 7, 2021

(54) METHODS AND APPARATUS FOR SIMULTANEOUS MULTIPROTOCOL PROCESSING OF DIFFERENT RADIO STANDARDS USING A COMMON PIPELINE

(71) Applicants: Ahmed Shahid, San Jose, CA (US); Tejas Maheshbhai Bhatt, Sunnyvale, CA (US); Eric Marenger, Montreal (CA)

(72) Inventors: Ahmed Shahid, San Jose, CA (US); Tejas Maheshbhai Bhatt, Sunnyvale, CA (US); Eric Marenger, Montreal (CA)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/110,957

(22) Filed: Aug. 23, 2018

(65) Prior Publication Data
US 2019/0141725 A1    May 9, 2019

(51) Int. Cl.
*H04W 72/12* (2009.01)
*H04B 1/403* (2015.01)
*H04B 1/38* (2015.01)
*H04W 88/06* (2009.01)

(52) U.S. Cl.
CPC .......... *H04W 72/1215* (2013.01); *H04B 1/38* (2013.01); *H04B 1/406* (2013.01); *H04W 88/06* (2013.01)

(58) Field of Classification Search
CPC .... H04W 72/1215; H04W 88/06; H04B 1/38; H04B 1/406

USPC ......................................................... 370/329
See application file for complete search history.

(56) References Cited

U.S. PATENT DOCUMENTS

| | | | | |
|---|---|---|---|---|
| 8,649,388 | B2 * | 2/2014 | Evans | H04W 88/085 370/353 |
| 2008/0161041 | A1 * | 7/2008 | Pernu | H04W 72/1215 455/553.1 |
| 2009/0291701 | A1 * | 11/2009 | Zetterman | H04W 72/1215 455/509 |

OTHER PUBLICATIONS

JESD207, "Radio Front End—Baseband Digital Parallel (RBDP) Interface" (Year: 2007).*
ECPRI Specification V1.0 (Aug. 22, 2017) (Year: 2017).*

* cited by examiner

*Primary Examiner* — Yemane Mesfin
*Assistant Examiner* — Intekhaab A Siddiquee
(74) *Attorney, Agent, or Firm* — JW Law Group; James M. Wu

(57) ABSTRACT

Methods and apparatus for simultaneous multiprotocol processing of different radio standards using a common pipeline. In an exemplary embodiment an apparatus includes a plurality of wireless interfaces that transmit radio data symbols, a scheduler that outputs scheduled events that control transmission of the radio data symbols using any wireless interface type and any radio protocol, and an event processor that processes the transmission events to transport the radio data symbols to selected wireless interfaces for over the air transmission using selected radio protocols.

20 Claims, 8 Drawing Sheets

METHODS AND APPARATUS FOR SIMULTANEOUS MULTIPROTOCOL PROCESSING OF DIFFERENT RADIO STANDARDS USING A COMMON PIPELINE

CLAIM TO PRIORITY

This application claims the benefit of priority based upon U.S. Provisional Patent Application having Application No. 62/549,308, filed on Aug. 23, 2017, and entitled "METHODS AND APPARATUS FOR MULTIPROTOCOL PROCESSING USING A COMMON PIPELINE" which is hereby incorporated herein by reference in its entirety.

FIELD

The exemplary embodiments of the present invention relate to the operation of communications networks. More specifically, the exemplary embodiments of the present invention relate to methods and apparatus for simultaneous multiprotocol processing of different radio standards using a common pipeline.

BACKGROUND

With the rapidly growing trend of mobile and remote data access over high-speed communication networks, such as 3G, 4G, or LTE cellular services, accurately delivering data has become increasingly challenging and difficult. A high-speed communication network that is capable of delivering information includes, but is not limited to, a wireless network, a cellular network, wireless personal area network ("WPAN"), wireless local area network ("WLAN"), wireless metropolitan area network ("MAN"), or the like. These networks typically utilize different transmission or network protocols based on industry standards for each protocol.

Currently, well defined baseband processing is used to implement each protocol across multiple chips or devices, which can include field programmable gate arrays (FPGA), application specific integrated circuits (ASIC), and digital signal processors (DSP). For example, in a transmitting device, data to be transmitted flows through specific pipeline stages implemented using multiple devices to generate a transmit signal that can be transmitted over the air (OTA). The devices of the pipelined stages provide specific functions, such as rate matching, encoding, and modulation. The functions of the pipelined stages can be reversed (demodulation, decoding, and rate dematching) in another set of devices to process received signals and convert these signals back to the original data.

However, conventional baseband systems have several limitations in that the existing pipeline processes implemented by hard-wired set of devices may not be suitable to process signals based on a particular protocol or standard. Thus, the pipeline process may need to be changed or modified for each type of signal and/or protocol that is to be used. Unfortunately, changing current baseband systems implemented with multiple devices (e.g., FPGA and DSP devices) to process different protocols may require significant effort to redesign the architecture and associated hardware and software interfaces. Such changes may not even be possible once these baseband systems are in use out in the field. Furthermore, the alarming rate of evolving radio standards, the constant demand for new features, and short development time have made the limitations of conventional baseband systems even more apparent.

Therefore, it would be desirable to have a baseband architecture that provides for programmable pipeline processing thereby allowing the baseband architecture to support different wireless interfaces and transmission protocols utilized by evolving radio standards.

SUMMARY

In various exemplary embodiments, methods and apparatus are provided for simultaneous multiprotocol processing of different radio standards using a common pipeline. The architecture comprises a processor subsystem that is able to simultaneously receive and transmit radio data symbols associated with multiple radio protocols and multiple wireless interfaces by generating a common time reference that is common to all the wireless protocols and using the time reference to align symbols for each protocol. The time reference is also used to schedule processing of the aligned symbols to transmit and receive radio data symbols associated with each wireless protocol.

In an exemplary embodiment, an apparatus is provided that comprises a plurality of wireless interfaces that transmit radio data symbols, a scheduler that outputs scheduled events that control transmission of the radio data symbols using any wireless interface type and any radio protocol, and an event processor that processes the transmission events to transport the radio data symbols to selected wireless interfaces for over the air transmission using selected radio protocols.

In an exemplary embodiment, a method is provided that includes operations of scheduling transmission of radio data symbols by a plurality of wireless interfaces using a plurality of wireless protocols, queuing the radio data symbols for transmission, and transmitting the radio data symbols using corresponding wireless interfaces and wireless protocols.

Additional features and benefits of the exemplary embodiments of the present invention will become apparent from the detailed description, figures and claims set forth below.

BRIEF DESCRIPTION OF THE DRAWINGS

The exemplary embodiments of the present invention will be understood more fully from the detailed description given below and from the accompanying drawings of various embodiments of the invention, which should not be taken to limit the invention to the specific embodiments, but are for explanation and understanding only.

DETAILED DESCRIPTION

Figure 1:
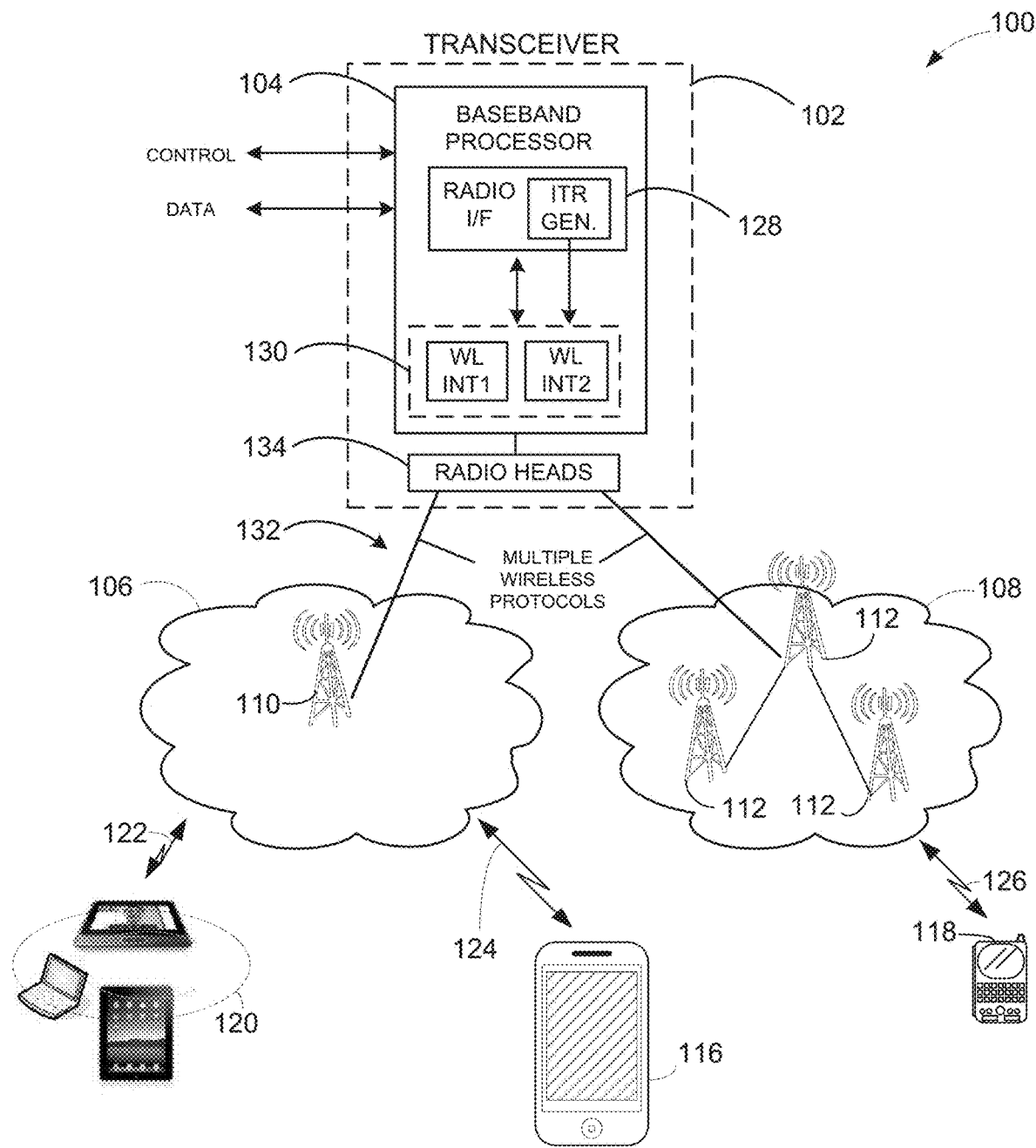
FIG. 1 shows an exemplary block diagram illustrating a communications network comprising a transceiver that includes exemplary embodiments of a baseband processor and wireless interfaces constructed in accordance with exemplary embodiments of the present invention.

The purpose of the following detailed description is to provide an understanding of one or more embodiments of the present invention. Those of ordinary skill in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business related constraints, and that these specific goals will vary from one implementation to another and from one developer to another. Moreover, it will be understood that such a development effort might be complex and time-consuming, but would nevertheless be a routine undertaking of engineering for those of ordinary skill in the art having the benefit of the embodiment(s) of this disclosure.

Various exemplary embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, sub-systems, devices, packet switch elements, packet switches, access switches, routers, networks, modems, base stations, eNB ("eNodeB"), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

FIG. 1 shows a block diagram illustrating a communications network 100 comprising a transceiver 102 that includes exemplary embodiments of a baseband processor 104. The baseband processor 104 includes wireless interfaces 130, which also may be referred to as radio media access controllers (MACs). The wireless interfaces 130 comprise, for example, a common public radio interface (CPRI), a JESD204B interface, a JESD207P interface, and a custom interface. It should be noted that the wireless interfaces 130 may comprise any other type of wireless interface. The baseband processor 104 further comprises a radio interface 128 that includes an internal time reference (ITR) generator. The transceiver 102 also includes radio heads 134 that transmit and receive signals using any type of wireless protocol.

Network 100 includes two cell sites 106 and 108 that can be independently configured as a third generation ("3G"), 4G, Long Term Evolution ("LTE"), or 5G network configurations or use other type of wireless network protocols.

Cell sites 106 and 108 include radio towers 110 and 112. Radio towers 110 and 112 are further coupled to various user equipment (UE) devices, such as a tablets and/or iPad® 120, cellular phone 116, and handheld device 118, via wireless communications links 122, 124, and 126. Cell site 106 facilitates network communication between mobile devices such as UEs 120 and 116 and transceiver 102 via radio tower 110 and cell site 108 facilitates network communication between UE 118 and transceiver 102 via radio tower 112. It should be noted that the cell sites 106 and 108 can include additional radio towers as well as other land switching circuitry.

The baseband processor 104 uses the radio interface 128 to support device communications using any type of wireless interface 130 to communicate using any type of radio protocol 132. For example, the wireless interfaces 130 can transmit and receive using any type of radio protocol 132, such as GSM, 3G, 4G, LTE, 5G or any custom protocol. Thus, the baseband processor 104 can simultaneously transmit and receive using multiple types of wireless interfaces and multiple types of wireless protocols. A more detailed description of the baseband processor 102 is provided below.

Figure 2:
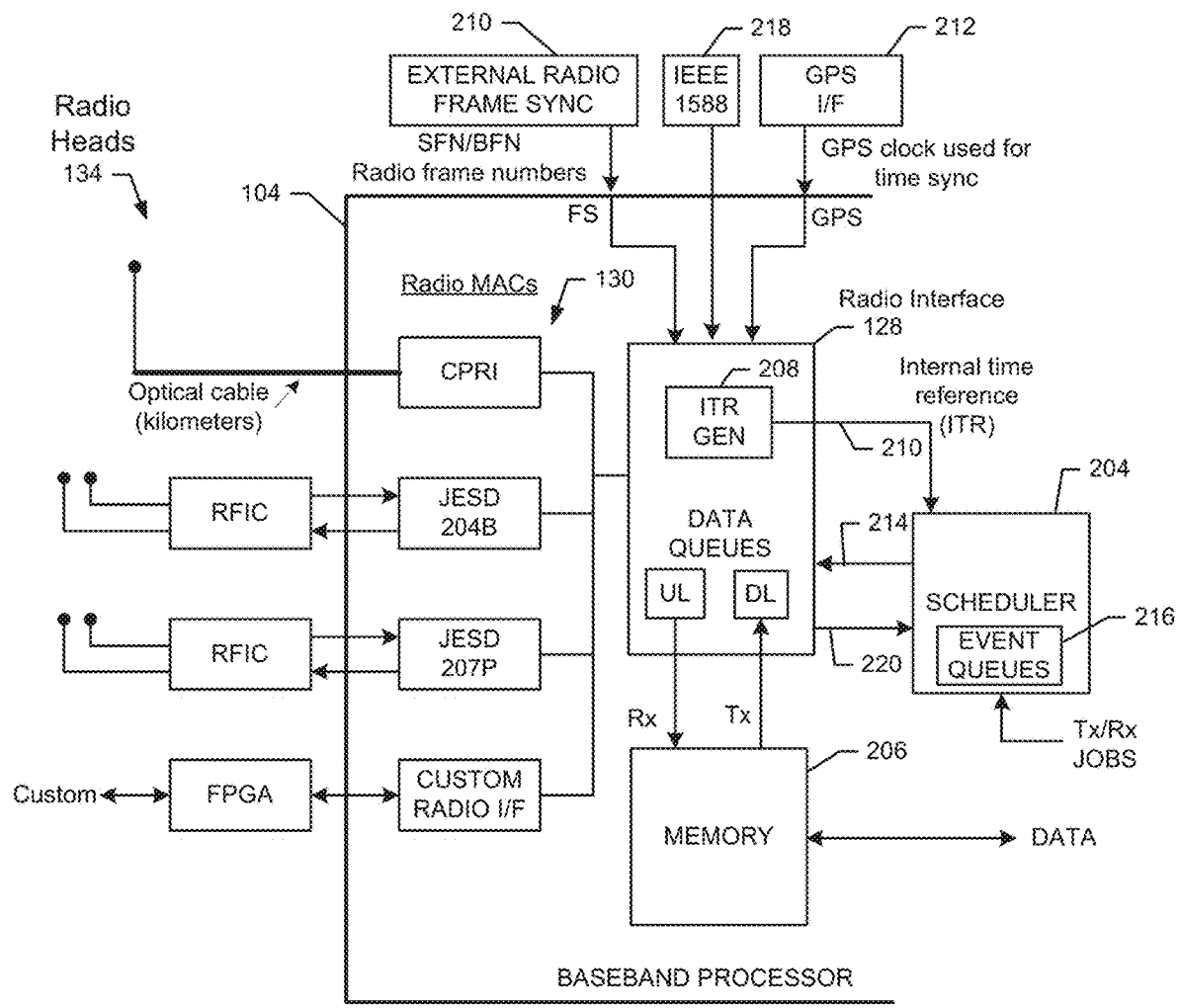
FIG. 2 shows a detailed exemplary embodiment of the baseband processor shown in FIG. 1.

FIG. 2 shows a detailed exemplary embodiment of the baseband processor 104 shown in FIG. 1. As shown in FIG. 2, radio heads 134 are coupled to the wireless interfaces (e.g., radio MACs) 130. In this embodiment, the wireless interfaces 130 comprise CPRI, JESD204b, JESD207b, and/or custom interfaces. In an exemplary embodiment, the radio heads 134 include radio frequency integrated circuits (RFIC) that couple the wireless interfaces 130 to antennas. The baseband processor 104 includes a scheduler 204, and memory 206.

The baseband processor 104 receives an external radio frame sync (FS) from block 210, a global positioning signal (GPS) from block 212, and an IEEE1558 signal from block 218. The FS, IEEE1558, and GPS signals are derived from a common highly accurate time reference. Other time references may also be utilized by the baseband processor 104. The time references are input to the internal time reference generator 208 and are used to generate an internal time reference (ITR) 210 or "common time reference." This generated ITR 210 is input the scheduler 204, which uses the ITR 210 to make scheduling decisions to transmit and receive data using multiple wireless protocols.

In an exemplary embodiment, the scheduler 204 comprises event queues 216 that are used to queue transmission and reception events. For example, in one embodiment, there are 64 event queues. The scheduled or queued events 214 are sent to the radio interface 128 to control the transmission and reception of data. The scheduler 204 also receives reception events 220 from the radio interface 128. For example, in one embodiment, a reception event comprises the reception of a complete symbol through one of the wireless interfaces.

The radio interface 128 also includes uplink (UL) and downlink (DL) data queues that temporarily store data to be transmitted or that has been received. For example, in one embodiment, there are a plurality of UL and DL queues and one or more of the queues are allocated for use with each wireless interface 130. The UL and DL queues interface with a memory 206 that stores data to be transmitted or data that has been received for use by the transceiver 102. A more detailed description of the operation of the baseband processor 104 is provide below.

Figure 3:
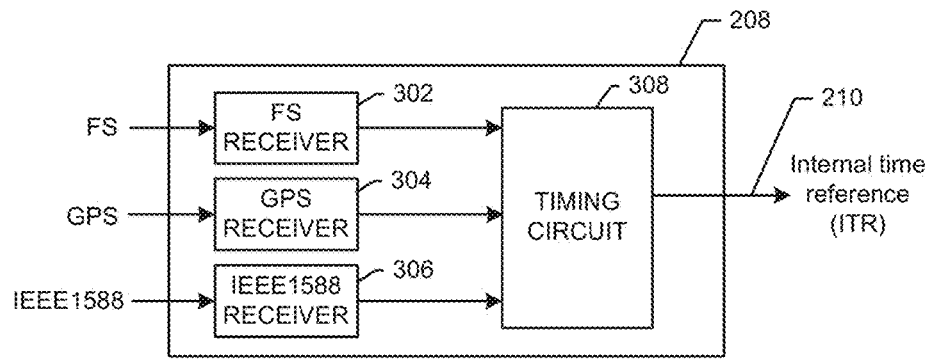
FIG. 3 shows a detailed exemplary embodiment of an internal time reference generator shown in FIG. 2.

FIG. 3 shows a detailed exemplary embodiment of the internal time reference generator 208. In an exemplary embodiment, the generator 208 comprises FS receiver 302, GPS receiver 304, and IEEE1588 receiver 306. Timing circuit 308 receives the three corresponding timing signals and selectively synchronizes to these signals to generate the internal time reference 210. Thus, the operation of the baseband processor 104 is synced to the internal time reference 210.

Figure 4:
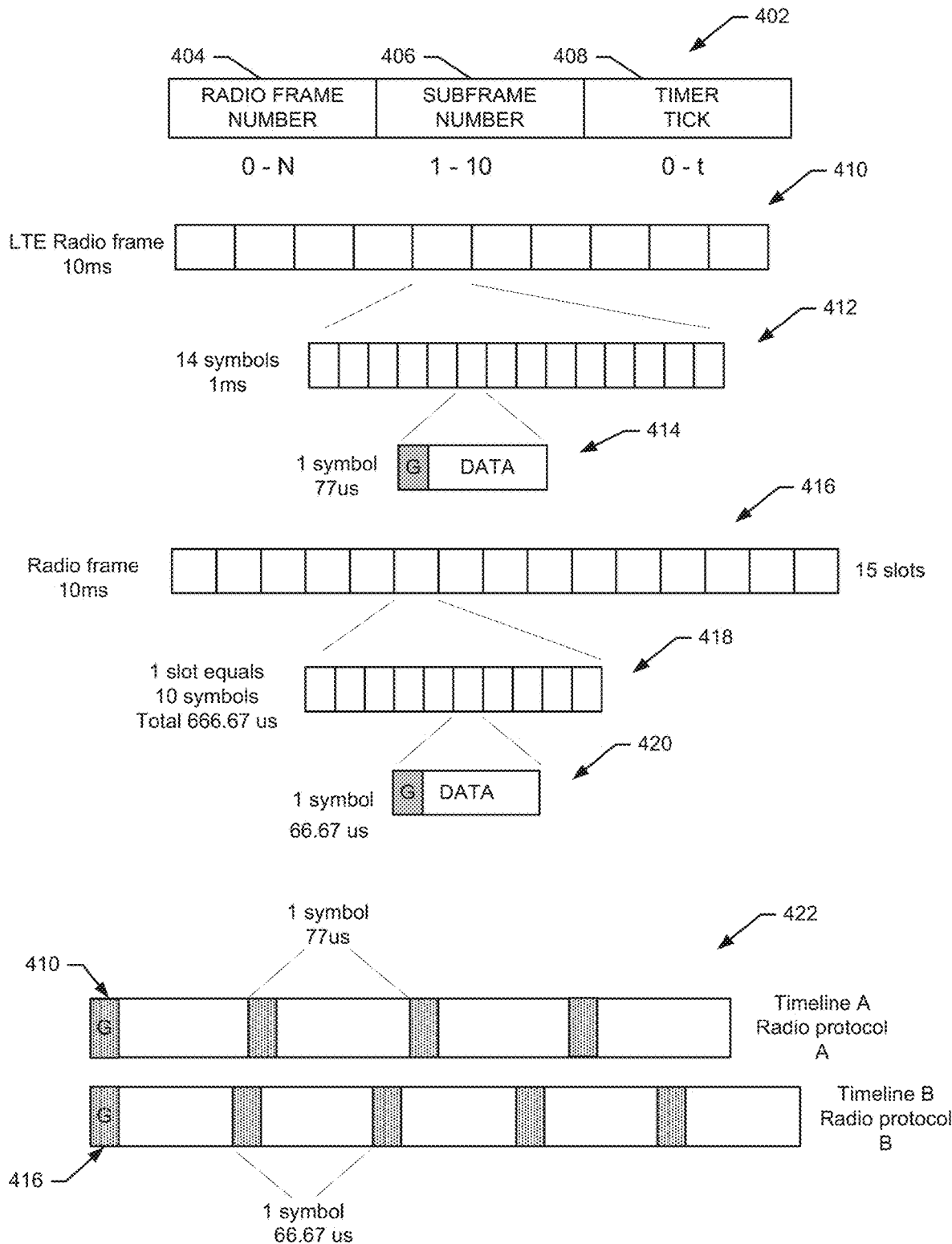
FIG. 4 illustrates multiple exemplary wireless protocol timelines that can be processed by the scheduler shown in FIG. 2.

FIG. 4 illustrates exemplary wireless protocol timelines that can be processed by the scheduler 204 shown in FIG. 2. As shown in FIG. 4, timeline 402 comprises a radio frame number 404, a subframe number 406 and a timer tick value 408. In an exemplary embodiment, the timer tick value 408 is based on the ITR 210. Thus, the timer tick value 408 represents the number of timer ticks within each subframe 406 and therefore the timer tick value 408 divides the timeline with very fine granularity. For example, the subframe 406 may be 1 millisecond in duration and the timer tick interval may be on the order of nanoseconds.

An exemplary LTE radio timeline is shown at 410 where the radio frame is 10 milliseconds in duration and includes 10 subframes. Each subframe is 1 millisecond in duration, and as shown at 412, each subframe comprises 14 symbols. As shown at 414, each symbol includes a guard band (G) and data and each symbol is 77 microseconds in duration.

Another exemplary radio timeline is show at 416 where the radio frame is 10 milliseconds in duration and includes 15 slots. As shown at 418, each slot is 666.67 microseconds in duration and includes 10 symbols. As shown at 420, each symbol includes data and is 66.67 microseconds in duration.

The timelines shown at 422, the timelines 410 and 416 representing two radio protocols are compared. For example, timeline 410 (A) represents the radio protocol having 10 subframes with 14 symbols per subframe and the timeline 416 (B) represent the radio protocol having 15 slots with 10 symbols per slot. In various exemplary embodiments, both timelines representing different radio protocols can be simultaneously processed by the scheduler 204.

Figure 5:
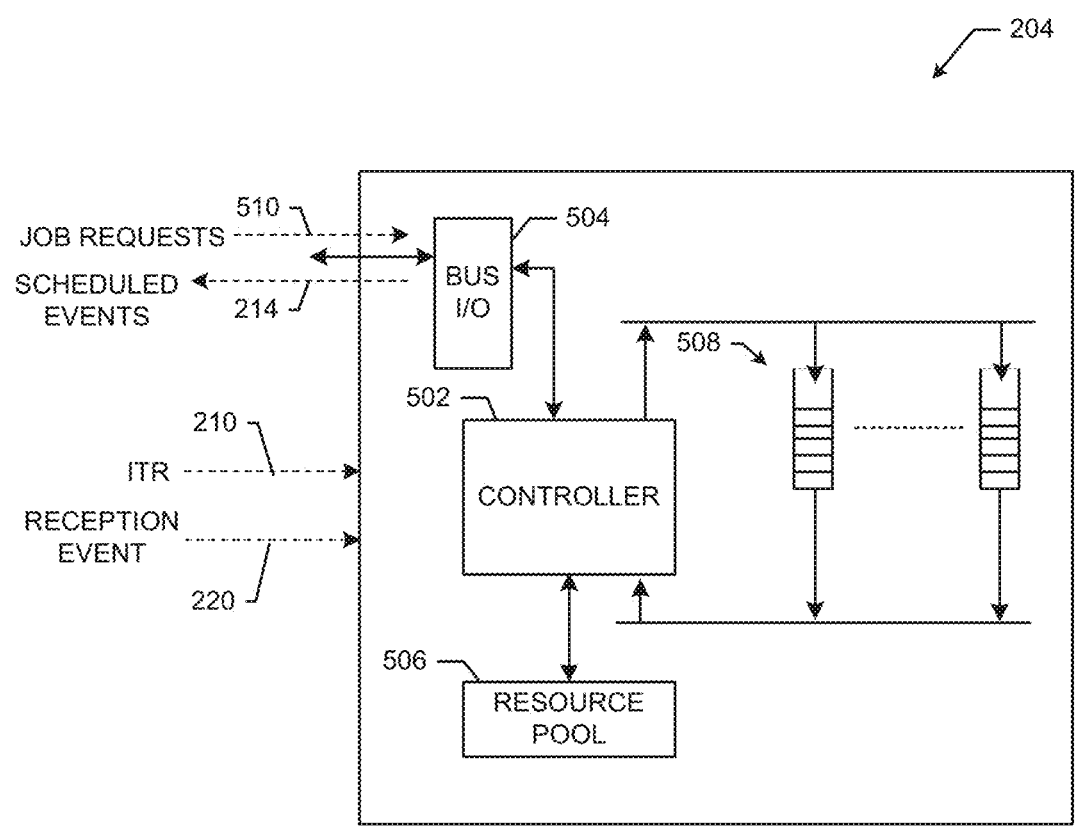
FIG. 5 shows exemplary embodiment of the scheduler shown in FIG. 2.

FIG. 5 shows exemplary embodiment of the scheduler 204 shown in FIG. 2. In an exemplary embodiment, the scheduler 204 comprises a controller 502, bus interface 504, one or more hardware queues 508 (event queues) and job resource pool 506. The controller 502 receives the job requests 510 through the bus interface 504 from a CPU or other entity at the transceiver. The jobs 510 describe the transmission or reception of data using one or more wireless interfaces and one or more wireless protocols.

The controller 502 receives the job requests 510 and schedules events in the queues 508 to accomplish the requested transmission or reception. For example, the controller schedules the transmission and reception events based on the timing of the received ITR 210 as applied to the desired wireless protocols. As shown with reference to FIG. 6, the controller 502 includes timing events in the queue of scheduled events to facilitate the transmission or reception of data using any wireless protocol. In an exemplary embodiment, the controller outputs the scheduled events 214 to the radio interface 128.

Referring again to FIG. 5, the scheduler 204 maintains a programmable resource pool 506 to assign job types to specific resources (e.g., functional elements). As the scheduled events exit the queues 508, the controller 502 routes them (e.g., as scheduled events) to the appropriate UL or DL functional element (e.g., as shown in FIG. 2) for completion. In an exemplary embodiment, the controller 502 may also utilize a reception event 220 during the event scheduling process.

Figure 6:
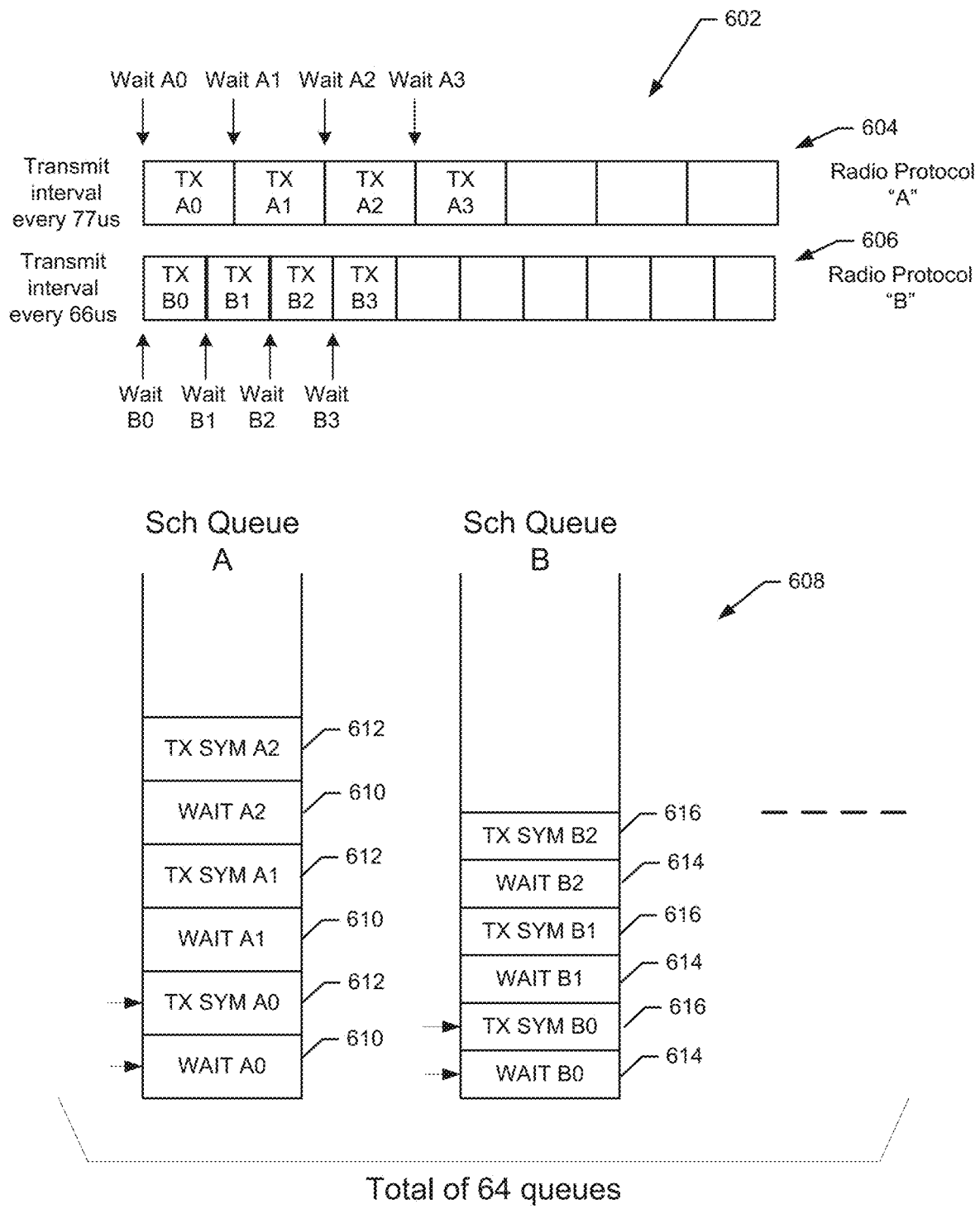
FIG. 6 shows exemplary timelines and event queues that illustrate the operation of the scheduler shown in FIG. 5.

FIG. 6 shows exemplary timelines and event queues that illustrate the operation of the scheduler 204 shown in FIG. 5. For example, two timelines shown at 602 illustrate different wireless protocols to be used to transmit data. In the timeline 604, the transmit interval of a radio data symbol for protocol A is every 77 microseconds. In the second timeline 606, the transmit interval for a radio data symbol for protocol B is every 66 microseconds.

During operation, the scheduler 204 generates event queues to transmit the radio data symbols according to the different wireless protocols. For example, the scheduler 204 schedules events that cause the DL function of the radio interface 128 to obtain data to be transmitted from the memory 206 and to store this data in one or more downlink data queues. The scheduler 204 schedules events that cause the DL function of the radio interface 128 to transmit the data using the desired wireless interfaces and the desired wireless protocol.

Exemplary scheduler queues are shown at 608. In one embodiment, the scheduler comprises 64 queues, however, in other embodiments, more or less queues are used. In an exemplary embodiment, the scheduler 204 processes each queue and determines the appropriate wait times to be included in each queue to enable symbol transmission using the desired wireless protocol. As illustrated in scheduler queue A, various wait intervals (e.g., 610) and symbol transmit events (e.g., 612) are included in the A queue. When these events are executed by the DL function, the symbols will be transmitted according to the first wireless protocol A. Similarly, as illustrated in scheduler queue B, various wait intervals (e.g., 614) and symbol transmit events (e.g., 616) are included in the B queue. When these events are executed by the DL function, the symbols will be transmitted according to the second wireless protocol B. It should be noted that the wait intervals may be different and set to any desired value. It should also be noted that the wait intervals are measured using the ITR 210.

Figure 7:
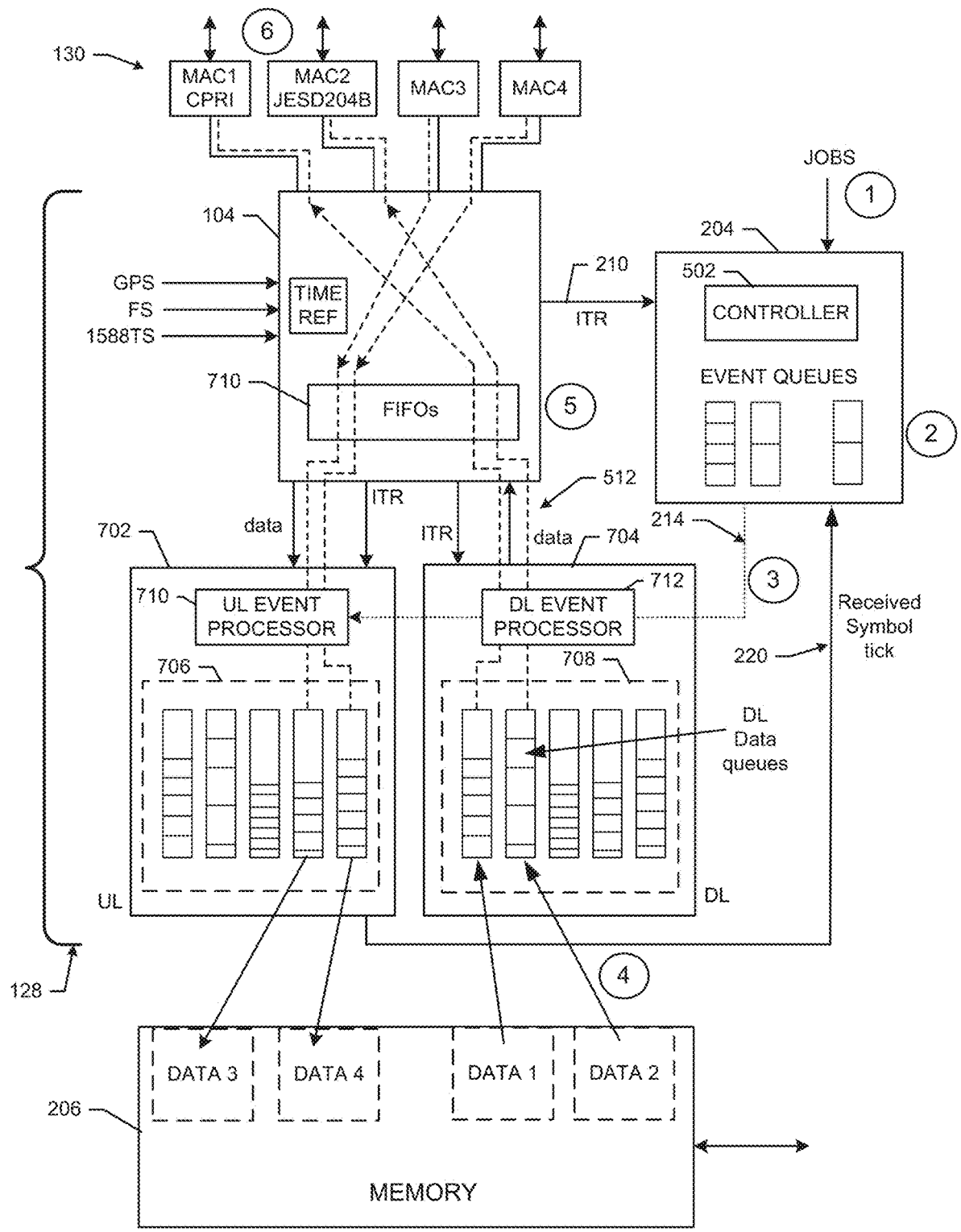
FIG. 7 shows exemplary operation of a baseband processor that includes the radio interface, scheduler, and uplink and downlink functions.

FIG. 7 shows exemplary operation of a baseband processor that includes the radio interface 128, scheduler 204, and UL 702 and DL 704 functions. The radio interface 128 receives timing signals and generates the internal time reference 210 that is passed to the scheduler 204. The following operations occur when transmitting radio symbol data using multiple wireless interfaces over multiple radio protocols.

At indicator 1, jobs requests are received by the scheduler 204. These requests are processed by the controller 502 to generate event queues to transmit data using multiple wireless interfaces over multiple radio protocols.

At indicator 2, the scheduler generates the event queues for the data transmissions based on the timing of the ITR 210. For example, the event queues include wait cycles that implement the different radio protocols to be used for the transmissions, for example, as illustrated in FIG. 6

At indicator 3, the scheduled events 214 are passed from the scheduler 204 to the DL event processor 712. The DL event processor 712 processes the scheduled events to transmit radio data symbols using multiple wireless interfaces over multiple radio protocols.

At indicator 4, the DL event processor 712 retrieves data from the memory 206. The data is loaded into DL data queues to be transmitted using multiple wireless interfaces over multiple radio protocols.

At indicator 5, the DL event processor 712 extracts the data from the DL data queues and move the data to the appropriate wireless interfaces through first-in-first-out (FIFO) registers. For example, Data1 is moved to MAC1 and Data2 is moved to MAC2. The data is moved to the wireless interfaces in accordance with the event timing to implement a desired wireless protocol. In an exemplary embodiment, the connection from a particular DL data queue through a particular FIFO to a particular wireless interface is preconfigured or programmable so that the DL event processor 712 is able to easily route the radio symbol data to the appropriate wireless interface.

At indicator 6, the wireless interfaces transmit the data. For example, the CPRI wireless interface transmit Data1 according to a first wireless protocol and the JESD204B wireless interface transmits Data2 according to a second wireless protocol. The first and second wireless protocols being determined by the timing implemented in the scheduler 204.

In various exemplary embodiments, data is simultaneously transmitted using any available wireless interface according to any wireless protocol. In this embodiment, two difference wireless interfaces simultaneously transmit data using two different wireless protocols. However, any number of wireless interfaces and any types of wireless protocols may be implemented. Thus, the embodiments described are exemplary and not limiting of the many variations achievable.

Figure 8:
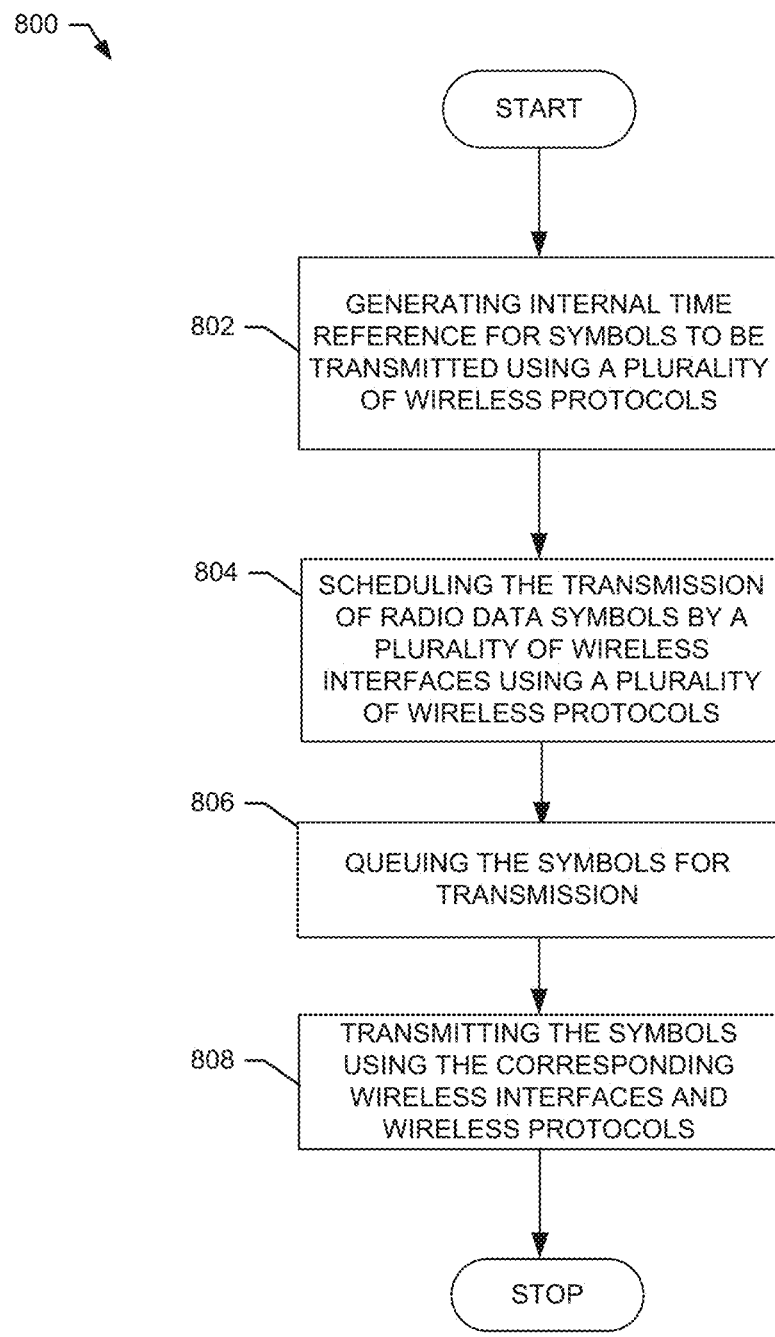
FIG. 8 shows an exemplary embodiment of a method for simultaneously transmitting data using multiple wireless interfaces over multiple radio protocols.

FIG. 8 shows an exemplary embodiment of a method 800 for simultaneously transmitting data using multiple wireless interfaces over multiple radio protocols. For example, the method is suitable for use with the baseband processor shown in FIG. 2.

At block 802, an internal time reference is generated that is common to a plurality of wireless protocols. For example, in an exemplary embodiment, the ITR generator 208 generates the internal time reference 210.

At block 804, an operation of scheduling the transmission of radio data symbols by a plurality of wireless interfaces using a plurality of wireless protocols is performed. For example, as shown in FIG. 7, the scheduler 204 generates the event queues that schedule the transmission of data1 using wireless interface MAC1 under a first wireless protocol. The scheduler 204 also generates the event queues that schedule the simultaneous transmission of data2 using wireless interface MAC2 under a second wireless protocol. Thus, virtually any combination of wireless interfaces and wireless protocols can be used to simultaneously transmit or receive radio symbol data.

At block 806, the symbols to be transmitted are queued in data queues for transmission. For example, the data from memory 206 is loaded into the DL data queues in preparation of transmission. For example, in an exemplary embodiment, the symbols are input to the DL data queues and there is a different data queue for each wireless protocol to be supported.

At block 808, the symbols in each queue are transmitted by the appropriate wireless interface according to their associated wireless protocol. For example, the DL event processor moves the data from the DL data queues to the appropriate wireless interface. The timing of the data transfer implements a particular wireless protocol. The connection of the data queues to the appropriate wireless interfaces is preconfigured or programmable.

Thus, the method 800 operates to simultaneously transmit symbols using different wireless interfaces and protocols. It should be noted that the method 800 is exemplary and not exhaustive of all the combinations wireless interfaces and wireless protocols that can be used for simultaneous transmission of data.

Figure 9:
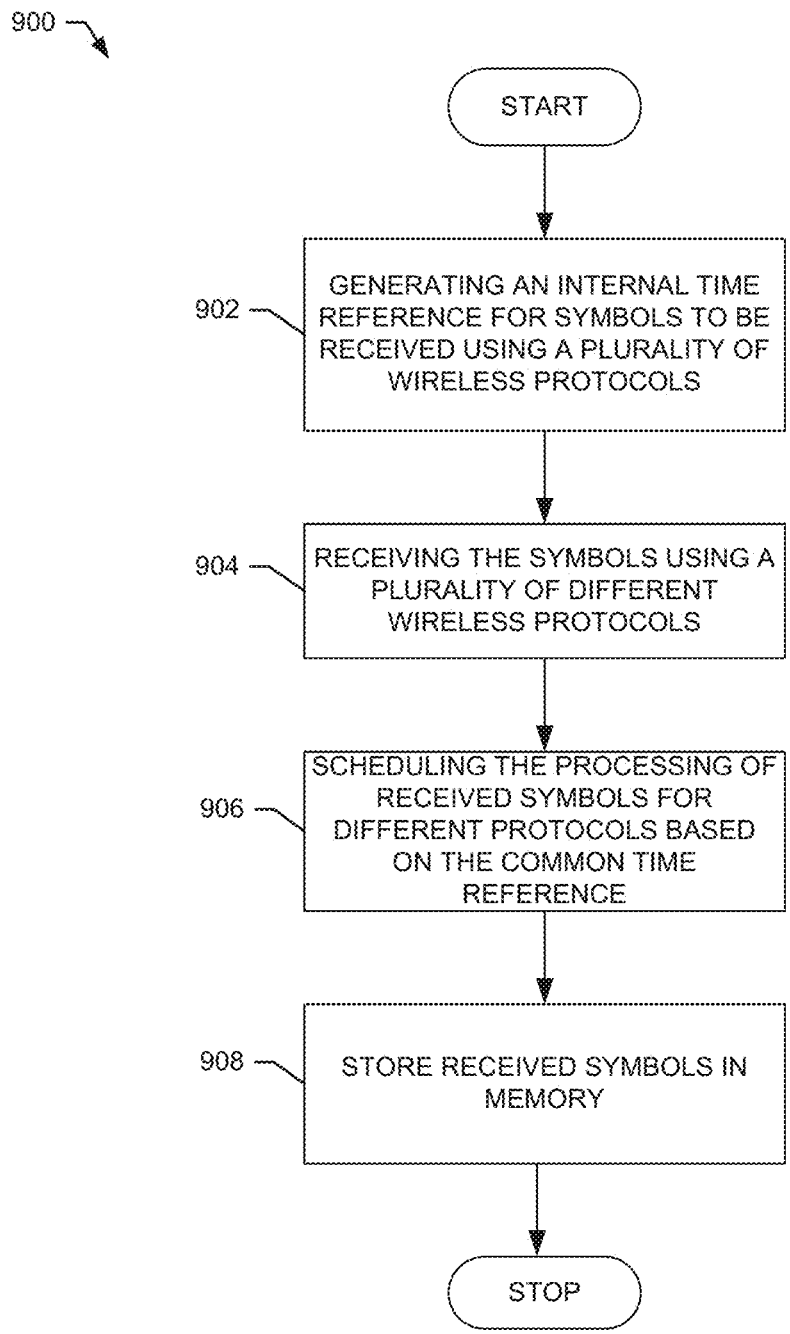
FIG. 9 shows an exemplary embodiment of a method for simultaneously receiving symbols at different wireless interfaces using different wireless protocols.

FIG. 9 shows an exemplary embodiment of a method 900 for simultaneously receiving symbols at different wireless interfaces using different wireless protocols.

At block 902, an internal time reference is generated that is common to a plurality of wireless protocols. For example, in an exemplary embodiment, the ITR generator 208 generates the internal time reference 210.

At block 904, symbols are received using a plurality of wireless protocols. For example, referring to FIG. 7, in an exemplary embodiment, the symbols are received by at two of the wireless interfaces 130 and stored in the uplink data queues.

At block 906, processing of the received symbols is scheduled by the scheduler. For example, the scheduler 204 generates scheduled events to process the received symbols. The event timing is based on the internal time reference.

At block 908, the symbols in each uplink data queue are moved to the memory for processing.

Thus, the method 900 operates to simultaneously receive symbols using different wireless interfaces and protocols. It should be noted that the method 900 is exemplary and not exhaustive of all the combinations wireless interfaces and wireless protocols that can be used for simultaneous reception of data.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. An apparatus, comprising:
   a wireless interface configured to transmit radio data symbols in accordance with a plurality of radio protocols;
   a timing circuit configured to receive a plurality of synchronization signals and generate an internal time reference that is selectively synchronized to the plurality of synchronization signals;
   a controller configured to receive a plurality of job requests including a first job request describing transmission of data using a first radio protocol of the plurality of radio protocols and a second job request describing transmission of data using a second radio protocol of the plurality of radio protocols;
   a scheduler configured to generate event queues based on the internal time reference, the event queues including:
      a queue of (i) first radio data symbols associated with the first job request, and (ii) first wait cycles interspersed with the first radio data symbols and having wait intervals corresponding to a transmit interval of the first radio protocol; and
      a queue of (i) second radio data symbols associated with the second job request, and (ii) second wait cycles interspersed with the second radio data symbols and having wait intervals corresponding to a transmit interval of the second radio protocol, wherein the transmit interval of the second radio protocol is shorter or longer than the transmit interval of the first radio protocol; and an event processor configured to process the event queues to control the wireless interface to transmit the first and second radio data symbols and wait during the first and second wait cycles.

2. The apparatus of claim 1, wherein the synchronization signals received by the timing circuit include an external radio frame synchronization signal, a global positioning signal, and/or a precision time protocol signal.

3. The apparatus of claim 1, wherein each event queue stores radio data symbols to be transmitted using a selected radio protocol of the plurality of radio protocols as described in a corresponding job request of the plurality of job requests.

4. The apparatus of claim 3, further comprising a memory coupled to the event queues.

5. The apparatus of claim 1, wherein each event queue stores selected transmission events that control how selected symbols are transmitted from the wireless interface to implement a selected radio protocol of the plurality of radio protocols.

6. The apparatus of claim 5, wherein the first wait cycles are based on a transmission timeline associated with the first radio protocol, and the second wait cycles are based on a transmission timeline associated with the second radio protocol.

7. The apparatus of claim 1, wherein the wireless interface comprises a common public radio interface (CPRI), a JESD204B interface, a JESD207 interface, or a custom wireless interface.

8. The apparatus of claim 1, wherein the plurality of radio protocols comprise two or more of 3G, 4G, 5G, 3G-WCDMA, 4G-LTE, 4G-LTE Advanced, 5G and custom radio protocols.

9. An apparatus, comprising:
a wireless interface configured to receive radio data symbols in accordance with a plurality of radio protocols;
a timing circuit configured to receive a plurality of synchronization signals and generate an internal time reference that is selectively synchronized to the plurality of synchronization signals;
a controller configured to receive a plurality of job requests including a first job request describing reception of data using a first radio protocol of the plurality of radio protocols and a second job request describing reception of data using a second radio protocol of the plurality of radio protocols;
a scheduler configured to generate event queues based on the internal time reference, the event queues including:
a queue of (i) first radio data symbols associated with the first job request, and (ii) first wait cycles interspersed with the first radio data symbols and having wait intervals corresponding to a transmit interval of the first radio protocol; and
a queue of (i) second radio data symbols associated with the second job request, and (ii) second wait cycles interspersed with the second radio data symbols and having wait intervals corresponding to a transmit interval of the second radio protocol, wherein the transmit interval of the second radio protocol is shorter or longer than the transmit interval of the first radio protocol; and
an event processor configured to process the event queues to control the wireless interface to receive the first and second radio data symbols and wait during the first and second wait cycles.

10. The apparatus of claim 9, wherein the synchronization signals received by the timing circuit include an external radio frame synchronization signal, a global positioning signal, and/or a precision time protocol signal.

11. The apparatus of claim 9, wherein each event queue stores radio data symbols to be received from a selected radio protocol of the plurality of radio protocols as described in a corresponding job request of the plurality of job requests.

12. The apparatus of claim 9, wherein each event queue stores selected reception events that control how selected symbols are received from the wireless interface to implement a selected radio protocol of the plurality of radio protocols.

13. A method, comprising:
receiving at a timing circuit a plurality of synchronization signals and generating an internal time reference that is selectively synchronized to the plurality of synchronization signals;
receiving at a controller a plurality of job requests including a first job request describing transmission of data using a first radio protocol of a plurality of radio protocols and a second job request describing transmission of data using a second radio protocol of the plurality of radio protocols;
generating event queues at a scheduler based on the internal time reference, the event queues including:
a queue of (i) first radio data symbols associated with the first job request, and (ii) first wait cycles interspersed with the first radio data symbols and having wait intervals corresponding to a transmit interval of the first radio protocol; and
a queue of (i) second radio data symbols associated with the second job request, and (ii) second wait cycles interspersed with the second radio data symbols and having wait intervals corresponding to a transmit interval of the second radio protocol, wherein the transmit interval of the second radio protocol is shorter or longer than the transmit interval of the first radio protocol; and
processing at an event processor the event queues to control a wireless interface to transmit the first and second radio data symbols and wait during the first and second wait cycles.

14. The method of claim 13, wherein the synchronization signals received by the timing circuit include an external radio frame synchronization signal, a global positioning signal, and/or a precision time protocol signal.

15. The method of claim 13, further comprising storing the radio data symbols to be transmitted using a selected radio protocol of the plurality of radio protocols as described in a corresponding job request of the plurality of job requests.

16. The method of claim 15, further comprising retrieving the radio data symbols to be transmitted from a memory before queueing the radio data symbols.

17. The method of claim 13, wherein each event queue stores elected transmission events that control how selected symbols are transmitted from the wireless interface to implement a selected radio protocol of the plurality of radio protocols.

18. The method of claim 13, wherein the first wait cycles are based on a transmission timeline associated with the first radio protocol, and the second wait cycles are based on a transmission timeline associated with the second radio protocol.

19. The method of claim 13, wherein the wireless interface comprises a common public radio interface (CPRI), a JESD204B interface, a JESD207 interface, or a custom wireless interface.

20. The method of claim 13, wherein the plurality of radio protocols comprise two or more of 3G, 4G, 5G, 3G-WCDMA, 4G-LTE, 4G-LTE Advanced, 5G and custom radio protocols.

* * * * *